Aug. 5, 1952     J. C. FROMMER     2,606,216
HIGH-FREQUENCY POWER MEASUREMENT UTILIZING A DYNAMOMETER
HAVING CURRENTS PROPORTIONAL TO PEAK VOLTAGE SWING
AND AVERAGE CURRENT
Filed Oct. 8, 1948

INVENTOR.
JOSEPH C. FROMMER.
BY
ATTORNEYS.

Patented Aug. 5, 1952

2,606,216

UNITED STATES PATENT OFFICE 2,606,216

HIGH-FREQUENCY POWER MEASUREMENT UTILIZING A DYNAMOMETER HAVING CURRENTS PROPORTIONAL TO PEAK VOLTAGE SWING AND AVERAGE CURRENT

Joseph C. Frommer, Cincinnati, Ohio

Application October 8, 1948, Serial No. 53,583

3 Claims. (Cl. 171—95)

This invention relates to the measurement of electrical power. It relates more particularly to an arrangement by means of which electrical energy supplied at high frequency, on the order of 1 to 100 megacycles, may be measured.

The invention herein disclosed is a simplification of my original development in this field, such original developments being disclosed in my co-pending application filed of even date herewith, now Patent No. 2,585,001, issued February 12, 1952, and entitled Method and Apparatus for the Measurement of High Frequency Power.

Electrical energy of high frequency has a variety of applications. Outside of the field of communication and the laboratory, it is not usually necessary to measure the power consumption to a high degree of accuray. It is essential, however, that the amount of energy applied be known within certain tolerance limits. This is particularly the case in an application such as the use of diathermy apparatus, by means of which high frequency energy is applied in the medical treatment of certain disorders of the human system.

Accordingly, it is an object of this invention to provide both a method, and means of measuring electrical energy supplied at high frequency.

It is a further object of this invention to provide a method and means for the measurement of electrical energy supplied at high frequency which is both inexpensive and simple to construct and employ.

Another object of this invention is to provide circuit means to compensate for certain errors and thus permit power measurements of higher accuracy.

Commercial electric power may be converted to high frequency energy by the use of oscillators. The methods are well known to those familiar with this art and will be only briefly described in conjunction with the accompanying drawings, which illustrate the preferred embodiment of my invention and constitute a part of this application in which like numerals are employed to designate like parts throughout.

Oscillators, which are required to produce continuously a substantial amount of power at high frequencies, are adjusted so that the tube operates as a Class C amplifier, in which operation the plate current is always in phase with the plate voltage. One of the most common forms of oscillator circuits is one in which the frequency is determined by an inductance and capacitance network in the plate circuit of the amplifier. This network is referred to as the "tank."

Figure 1:
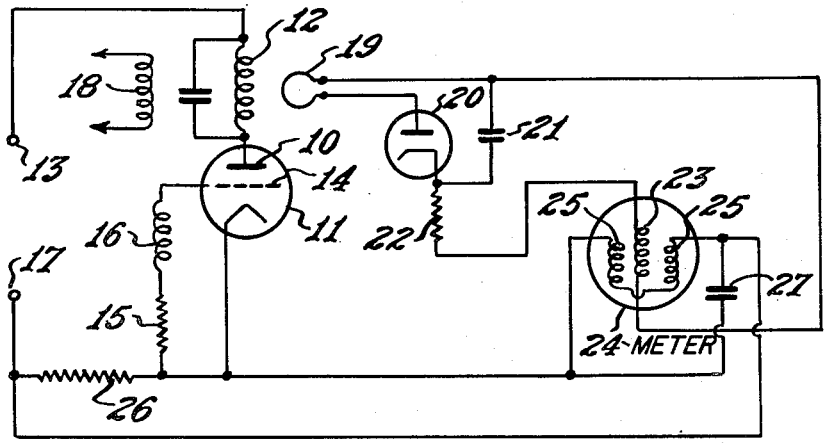
Figure 1 is a schematic diagram of the basic arrangement for measuring high frequency power.

In Figure 1 of the drawings, the plate 10 of the tube 11 is connected through the tuned circuit 12 to the positive terminal 13 of the plate-voltage supply. The grid 14 of the tube 11 is connected, through the grid resistor 15 and choke coil 16, to the negative terminal 17 of the voltage supply. The grid bias is generated by the plate current which flows in the grid resistor 15. The load may be inductively coupled to the tank circuit 12 as indicated at 18.

In the arrangements of my invention, I provide a pick-up circuit, and place a pick-up coil 19 in inductively coupled relation to the tank circuit 12. The voltage which may be induced in this coil is rectified by the rectifier tube 20 in the pick-up circuit. The rectified output is filtered by the capacitor 21 and the rectified and filtered output is placed through suitable resistance 22 across the movable coil 23 of an electro-dynamometer 24. The stationary coil 25 of the dynamometer is connected in parallel with the resistor 26 through which flows the plate current of the oscillator circuit. A capacitor 27 is placed in parallel with the stationary coil 25 in order to filter out the high frequency ripple appearing across this coil.

In the above described arrangement, it will be noted that a current proportional to the plate peak voltage swing is rectified, filtered, and placed across the movable coil 23 of the dynamometer 24 and that a current, proportional to the average plate current, is filtered and placed across the stationary coil 25 of the dynamometer 24. Accordingly, the reading of the dynamometer will be proportional to the product of the average plate current and the plate peak voltage swing.

In the above described arrangement, however, there are two sources of error. The first error is that the dynamometer reading includes the losses in the tank circuit. These losses are directly proportional to the square of the plate swing voltage, and proper compensating means may be easily provided, as will be described hereinafter. The second error arises from the fact that the angle of plate current flow, that is, the portion of the cycle during which current flows in the oscillator tube, is not limited to the time during which the plate voltage has its peak value.

A factor K may be used to compensate for the error due to this angle of current flow. The value of K would be unity for an angle of 0 degrees; the lower limit of possible angles of current flow. The value of K is above 0.8 for most practical conditions. If, therefore, we provide an instrument which will read 0.9 times the product of the average plate current and the peak of the plate swing, the error will remain below about ten (10%) per cent for practical conditions. The general considerations upon which the foregoing presentation of current flow factor is based will be found in a paper by W. G. Wagener Proc. I. R. E., vol. 25, pp. 47–77, January 1937.

If the plate swing peak voltage is denoted by $E_p$, the average plate current by I and the ohmic resistance, equivalent to the losses in the tank circuit, by R, then the net output P is:

(1) $\qquad P = E_p I \times K - E_p^2/2R$

Figure 2:
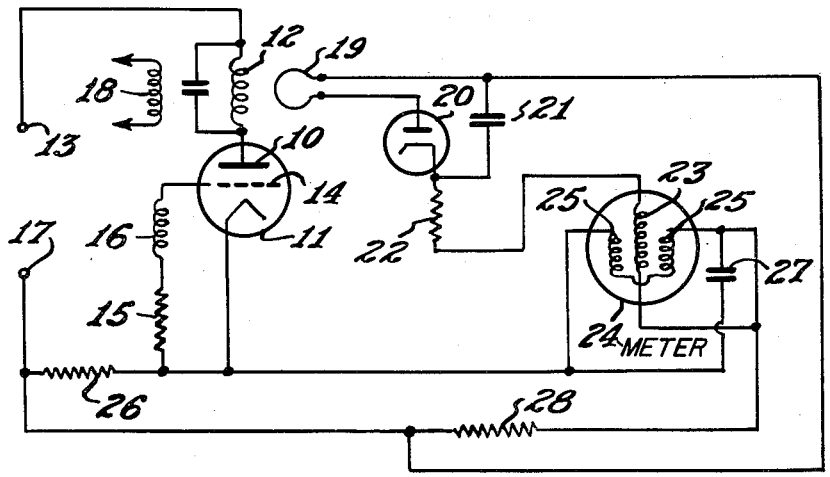
Figure 2 is a modification which is used in actual practice to obtain power measurements of higher accuracy.

I have found that K, the angle of current flow factor, may be replaced, with sufficient accuracy, by the expression:

(2) $\qquad K = 1 - kI/E_p$ in which $k$ is a proportionality factor, the value of which depends upon the circuit data of the oscillator employed. Substituting the expression (2) in (1), the latter becomes:

(3) $\qquad P = E_p I(1 - kI/E_p) - E_p^2/2R$ (4) $\qquad P = E_p I - kI^2 - E_p^2/2R$ The modified schematic diagram of Figure 2 is designed so that the dynamometer 24 will give readings proportional to (4) above in which the losses in the tank and the K factor compensation are deducted. The components and circuit arrangements of Figure 2 are the same as those shown in Figure 1 with the addition of the resistor 28. This resistor element is connected in series in the circuit containing the voltage coil 23 and also in the circuit containing the current coil 25. This connection of the resistor 28, coupling the current in coil 23 with the current in coil 25, provides a voltage which is the sum of two components; one of which is proportional to the current in coil 23, and the other proportional to current in coil 25. This voltage drop across resistor 28 will cause a decrease in each current flowing through the two dynamometer coils; the current $I_{23}$ through coil 23 will be proportional to:

(5) $\qquad I_{23} \propto C_1 E_p - C_2 I$ and the current $I_{25}$ through coil 25 will be proportional to:

(6) $\qquad I_{25} \propto C_3 I_1 - C_4 E_p$

The resulting torque is proportional to the product of these two currents, and the indication by the dynamometer will be proportional to:

(7) $\qquad (C_1 E_p - C_2 I)(C_3 I - C_4 E_p)$

The indicated product of these terms may be expressed as:

(8) $\qquad (C_1 C_3 + C_2 C_4) E_p I + C_1 C_4 E_p^2 + C_2 C_3 I^2$

It will be observed that the expression (8) is made up of one $E_p^2$ term, one $I^2$ term and a term $E_p I$. Further, this expression is similar to the expression (4) containing the same terms of the same order. The expression in (4) was shown to be the net output of the oscillator circuit with the tank circuit losses $E_p^2/2R$ subtracted and with compensation for the angle of current flow.

In setting up the oscillator and measurement circuits, values of the components may be chosen for $C_1$, $C_2$, $C_3$ and $C_4$ such that the indication of the dynamometer is exactly equal to the mathematically derived value, as shown in (4) above, of the net power output supplied to the load circuit (4).

It is to be understood that the form of my invention, herewith shown and described, is to be taken as a preferred example of the same, and that various changes in the arrangements of the circuits may be resorted to without departing from the spirit of my invention, or the scope of the subjoined claims. Especially it is possible to use the moving coil of the dynamometer for the average plate current and the stationary coil for the rectified high frequency voltage instead of the way shown in the example.

Having thus described my invention, what I claim as new and desire to secure by Letters Patent is:

1. Apparatus for measuring the net energy output of a self-excited oscillator having a tuned plate circuit comprising a voltage pick-up circuit containing a pick-up element responsive to the peak plate voltage of said oscillator, a rectifier in said pick-up circuit which supplies the movable coil of an electrodynamometer, an impedance circuit responsive to the average plate current of said oscillator which supplies the stationary coil of said electrodynamometer and an impedance element which is common to said pick-up circuit and said impedance circuit and which supplies to the movable coil a current proportional to the average plate current and supplies to the stationary coil a current proportional to the peak plate voltage, whereby the indication by the electrodynamometer is proportional to the net energy output of the oscillator.

2. Apparatus for the measurement of high frequency power which comprises an oscillator circuit, a pick-up circuit responsive to the voltage in said oscillator circuit, an impedance circuit responsive to the current in said oscillator circuit, an electrodynamometer having its moving coil supplied by said pick-up circuit and its stationary coil supplied by said impedance circuit, and a resistor element in series with and common to both said pick-up circuit and said impedance circuit.

3. Apparatus for use in the measurement of power in a high frequency oscillator circuit which comprises a pick-up circuit responsive to the peak plate voltage of said oscillator circuit, an impedance circuit responsive to the average plate current of said oscillator circuit, and an electrodynamometer the moving coil of which is supplied by said pick-up circuit and the stationary coil of which is supplied by said impedance circuit, said pick-up circuit being provided with a pick-up element responsive to the peak plate voltage of said oscillator circuit, a rectifier, a filter and a resistance unit, said impedance circuit being provided with a capacitor so as to filter out high frequency ripple appearing across said stationary coil, said apparatus also including a resistor element connected in series in the pick-up circuit, said resistor element also being connected in series in said impedance circuit.

JOSEPH C. FROMMER.

REFERENCES CITED

The following references are of record in the file of this patent:

UNITED STATES PATENTS

| Number | Name | Date |
|---|---|---|
| Re. 22,258 | Mittelmann | Jan. 26, 1943 |
| 1,960,256 | Wallace | May 29, 1934 |
| 2,378,846 | Hansell | June 19, 1945 |
| 2,434,544 | Boykin | Jan. 13, 1948 |
| 2,523,476 | Mittelmann | Sept. 26, 1950 |